E. Morris,
Door Check.
Nº 6,549. Patented June 19, 1849

UNITED STATES PATENT OFFICE.

EDMD. MORRIS, OF BURLINGTON, NEW JERSEY.

DOOR-HOLDER.

Specification of Letters Patent No. 6,549, dated June 19, 1849.

*To all whom it may concern:*

Be it known that I, EDMUND MORRIS, of the city of Burlington, in the county of Burlington, State of New Jersey, have invented a new and Improved Mode of Constructing Turnbuckles for Window-Shutters and Doors of all Kinds; and I do declare that the following is a full and exact description thereof, reference being also had to the annexed drawings making part of this specification.

To enable others skilled in the art to make and use my invention, I will proceed to describe its construction and operation—

Figure 1:
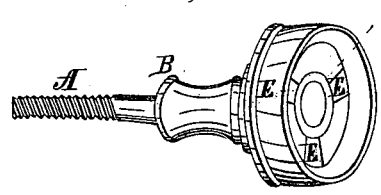
Figure 3:
Figure 4:
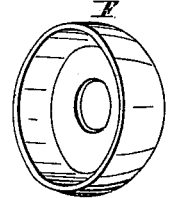
Figure 5:
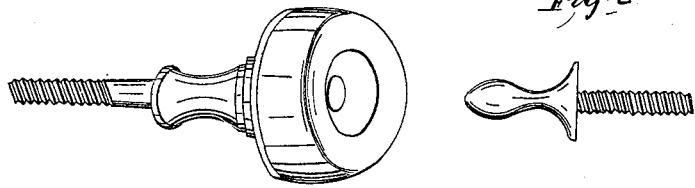
Figure 2:
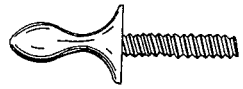

I construct a cup-shaped vessel, either of wood or metal, as shown in Figure 1, of any suitable dimensions, according to the size and weight of the door or shutter which it is intended to hold or fasten back. This cup is provided with a screw A, for the purpose of fastening the cup or turnbuckle into the side of the house, if for a window shutter, or into the wash-board if for a door, so that when screwed up against a brick or stone wall into which a plug may have been inserted to receive this screw, the collar B will conceal the plug from view. The cavity C, is to receive the knob shown in Fig. 2. At the mouth of this cavity C, there is a shoulder D, which is intended to support a disk of gum elastic, Fig. 3, which disk is perforated with a small circular hole in the center, and which may be made of any suitable thickness. This disk is to be dropped on the shoulder D, above described. When the disk is so inserted, the cap or top F, Fig. 4, is fitted on the cup, either by rivets, screws, soldering, or any other convenient process, thus tightly inclosing the disk of gum, and exposing to view only a small margin of gum around the hole in the center of the disk, the cup or top also having a circular hole made in the center of it, but somewhat larger than the hole in the center of the gum disk. This part of the turnbuckle being thus completed, it is to be then screwed into the siding or wall of the house, behind the window shutter, by screws or any other convenient method. The knob, Fig. 2, which may also be made of wood or metal, being provided with a screw at one end, is now inserted in the outside of the shutter, directly opposite the turnbuckle fastened on the house, so that when the shutter is thrown back, the projecting knob will strike the hole in the disk of gum, whose elasticity will permit the knob to pass readily beyond the gum into the cavity of the cup, made there to receive it. The knob having thus passed through the gum, the gum again expands and retains the knob in the cavity with so strong a grasp that the shutter is held firmly back, without its swaying to and fro by the wind, while the whole apparatus is entirely out of sight. The shutter is disengaged, when it is to be closed, by simply reaching out the hand and gently withdrawing the knob from the cup or cavity. A complete turnbuckle is shown at Fig. 5.

By the use of this instrument, the chafing of the shutter by the turnbuckle, now so generally observable, is entirely avoided, as well as the unpleasant noise occasioned in a high wind by the playing of the shutter to and fro, when the turnbuckle is fastened at too great a distance from the wall, which is often done to avoid the chafing before referred to. Besides these advantages, the shutter is effectually fastened back by simply throwing it open against the wall, without the unpleasant resort to reaching out to secure it behind the turnbuckle, and it is closed with equal facility. The tightness of the hold upon the knob, may be regulated at pleasure by enlarging or contracting either the knob or the size of the hole in the gum through which the knob is to pass.

The base of both knob and cup may be provided with a screw cast in at the foundry, or a straight shank, for driving into the wall; or both may be omitted, and the collar at the base of each may be screwed to the side of the house or shutter, or a screw may be made to pass through the bottom of the cup, and be driven home by inserting a screw-driver through the hole in the gum disk.

What I claim as my invention, and desire to secure by Letters Patent, is—

The method of constructing turnbuckles or fastenings for shutters and doors of all kinds, by attaching a plug or knob to the back of the shutter or door, the same fitting or passing into the cavity of a cup-shaped vessel, through an aperture in a disk of india rubber or other elastic substance, being so regulated as to grasp the knob and keep the door or shutter back, substantially as described.

EDMUND MORRIS.

Witnesses:
SAMUEL ATKINSON,
HORACE B. ATKINSON.